(12) United States Patent
Church et al.

(10) Patent No.: US 7,125,081 B2
(45) Date of Patent: Oct. 24, 2006

(54) PUSH CHAIR SEAT ATTACHMENT

(75) Inventors: Graham Church, Northampton (GB); Michael Peters, Northampton (GB)

(73) Assignee: Armon LTD, Geneva (CH)

( * ) Notice: Subject to any disclaimer, the term of this patent is extended or adjusted under 35 U.S.C. 154(b) by 0 days.

(21) Appl. No.: 10/989,941

(22) Filed: Nov. 16, 2004

(65) Prior Publication Data

US 2005/0120522 A1    Jun. 9, 2005

(30) Foreign Application Priority Data

Nov. 21, 2003   (GB)   ................... 0327160.8

(51) Int. Cl.
*B62B 7/08*   (2006.01)
(52) U.S. Cl. .................. 297/440.11; 297/226; 280/650
(58) Field of Classification Search ........... 297/440.11, 297/226, 228.11; 280/650
See application file for complete search history.

(56) References Cited

U.S. PATENT DOCUMENTS

| | | | | |
|---|---|---|---|---|
| 4,072,318 A | * | 2/1978 | Laune | ................... 280/42 |
| 4,542,915 A | * | 9/1985 | Wheeler et al. | ............ 280/642 |
| 5,076,599 A | * | 12/1991 | Lockett et al. | ............... 280/204 |
| 5,762,403 A | * | 6/1998 | Robinson | ................ 297/440.11 |
| 5,911,478 A | * | 6/1999 | Goodman | ............... 297/440.11 |
| 6,511,562 B1 | * | 1/2003 | Coffield | ................. 297/440.11 |
| 6,560,827 B1 | | 5/2003 | Gross | |
| 6,767,066 B1 | * | 7/2004 | Tornero | ................. 297/440.11 |

FOREIGN PATENT DOCUMENTS

| | | |
|---|---|---|
| EP | 0 925 745 | 6/1999 |
| GB | 1 257 927 | 7/1969 |

* cited by examiner

*Primary Examiner*—Peter R. Brown
(74) *Attorney, Agent, or Firm*—Andrew Wilford

(57) ABSTRACT

A seat attaching means for connecting a non-rigid push chair seat to a push chair frame said attaching means including an elongate member, attachable to at least one of the side edges of the seat, and the seat attaching means including a corresponding groove in the frame, into which the elongate member is inserted. The elongate member includes a planar part and an enlarged part, the planar part being attachable along at least one of the side edges of the seat and the enlarged part being insertable in the corresponding groove in the frame. The elongate member is insertable in a first corresponding groove in the frame and in a second corresponding groove in the frame, the first and second corresponding grooves being separated by a hinge. The first and second grooves are co-linear.

6 Claims, 4 Drawing Sheets

PUSH CHAIR SEAT ATTACHMENT

FIELD OF THE INVENTION

The present invention relates to push chairs for children, and in particular means for attaching the seat to the push chair frame.

BACKGROUND OF THE INVENTION

The conventional construction of a push chair consists of two A frames linked by cross struts, the frames having a seat located between them. The seat fabric is usually attached to the forward bars of the side frames, by wrapping each side edge of the seat fabric around the outside of the forward bar of the seat frame and pinning the wrapped fabric to the forward bar or onto the main part of the seat fabric.

OBJECT OF THE INVENTION

The invention has as its object to improve the attachment of a push chair seat to a push chair frame.

SUMMARY OF THE INVENTION

According to the invention, there is provided a seat attaching means for connecting a non-rigid push chair seat to a push chair frame said attaching means including an elongate member, attachable to at least one of the side edges of the seat, and the seat attaching means including a corresponding groove in the frame, into which the elongate member is inserted.

According to another aspect of the invention, there is provided a fibrous tension member for connecting a non-rigid push chair seat to a push chair frame, the fibrous tension member being attachable to at least one of the side edges of the seat and insertable in a corresponding groove in the frame.

According to another aspect of the invention, there is provided a push chair comprising a non-rigid seat, a frame, and seat attaching means for connecting the seat to the frame, the seat attaching means including an elongate member attachable to at least one of the side edges of the seat, and the seat attaching means including a corresponding groove in the frame, into which the elongate member is inserted.

According to another aspect of the invention, there is provided a method of attaching a non-rigid push chair seat to a push chair frame, the method comprising the steps of attaching an elongate member to at least one of the side edges of the seat and inserting the elongate member in a corresponding groove in the frame.

BRIEF DESCRIPTION OF THE DRAWINGS

A seat attaching means embodying the invention will now be described, by way of example, without limitation to the scope of the invention, which is limited only by the claims, and with reference to the drawings, in which:

DESCRIPTION OF THE PREFERRED EMBODIMENT

Figures 1, 2:
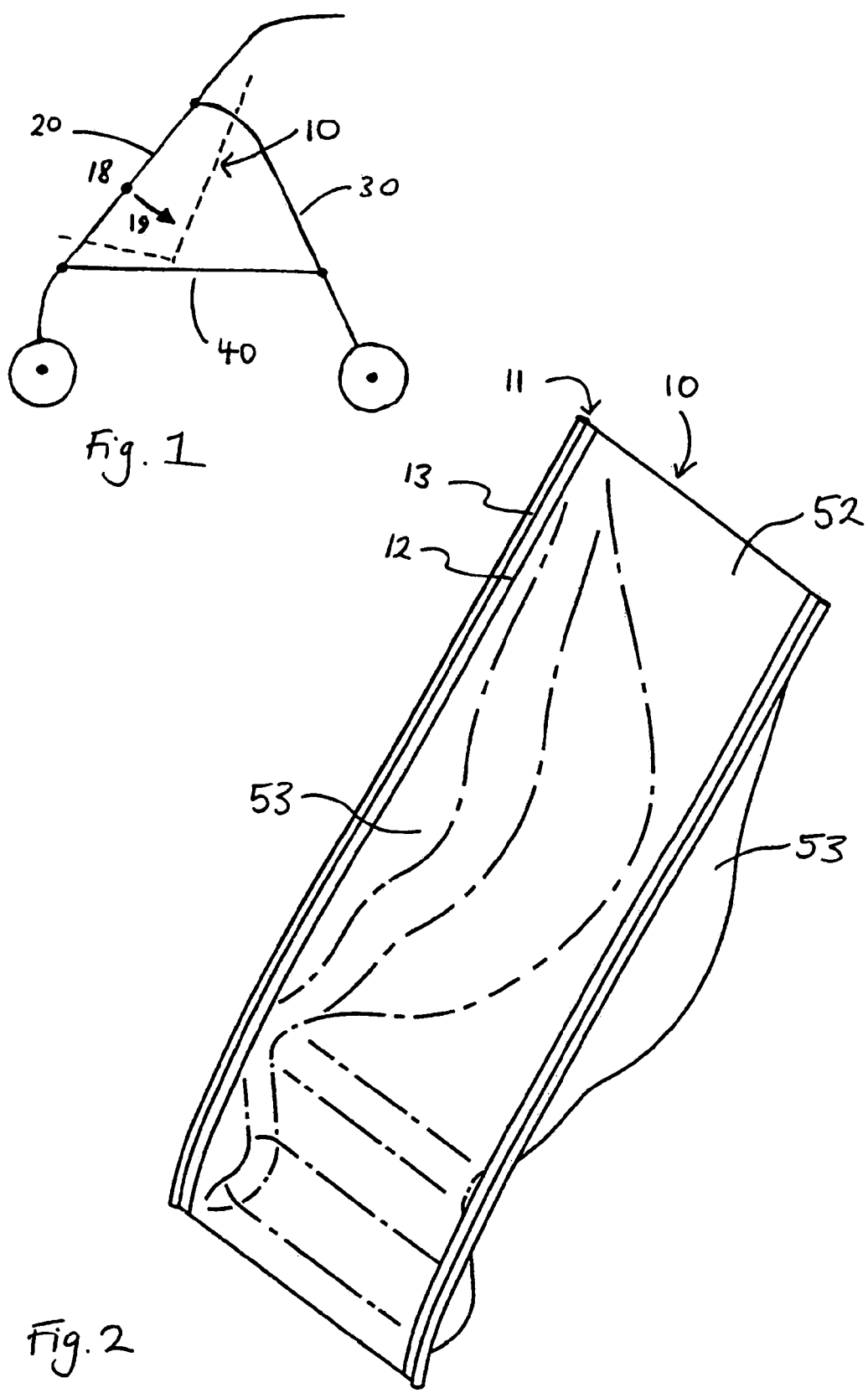
FIG. 1 is a diagrammatic side view of the main structural components of a push chair.
FIG. 2 is a front view of the push chair seat with an intermediate connection member attached.

Referring to FIG. 1, the A frame of one side of a basic umbrella push chair consists of a forward sloping bar 20, a rear sloping bar 30, and a bottom bar 40. The front of the side of the seat is attached, to the forward sloping bar 20 of each A frame (attachment not shown in FIG. 1). The forward sloping bar 20 has a hinge 18, located roughly midway along the bar. In FIG. 1, the hinge 18 is unfolded (the unfolded state). The hinge can be folded to allow the forward bar 20 to fold inward, as indicated by arrow 19, to collapse the frame and allow the push chair to be folded for storage (the folded state).

Referring to FIG. 2, showing an embodiment of a fabric push chair seat 10, the seat being attached to an intermediate connection member 11, which is used to attach the seat to the push chair frame. The intermediate connection member 11 has a planar part 12 and a cylindrical part 13, disposed along one of the long edges of the planar part 12. The planar part 12 is stitched or glued onto the seat fabric 10. Similarly, a corresponding intermediate connection member 11 is attached to the other side of the seat.

The seat is made of fabric, and may comprise separate portions, sewn together to form a seat shape. For example, a typical seat 10 will have a back portion 52 and side portions 53 extending forwards from the back portion 52. The seat may include a stiff or rigid material within the fabric, to help retain the seat shape.

Figure 3:
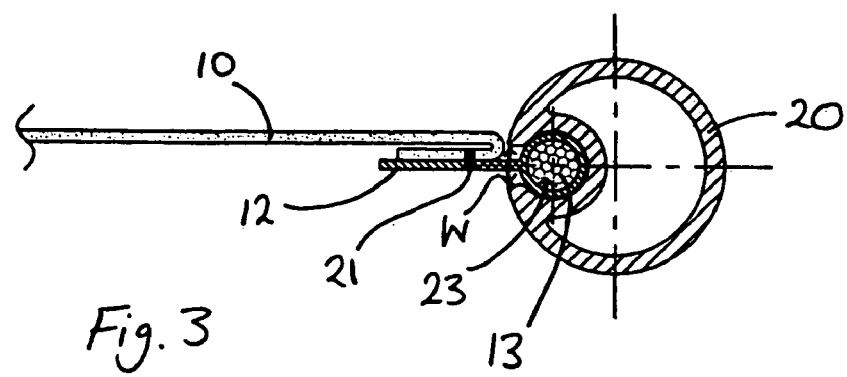
FIG. 3 is a cross-sectional view of the seat, frame, and the intermediate connection, perpendicular to the axis of the forward bar.

Referring to FIG. 3, one side edge of the seat is shown, attached to the forward bar 20 of the seat frame, using the intermediate connection member 11. The intermediate connection member 11 consists of a cord 13, wrapped in a cover 12. The cover 12 is an elongate rectangular piece of flexible PVC or strong fabric. The cover 12 is extruded around the cord so that the cord is disposed in the cover, with its axis parallel with the long axis of the cover. Alternatively the cover is wrapped around the cord and glued to the cord. The overlapping edges of the cover 12 are glued to each other. The intermediate connection member 11 therefore comprises a long cylindrical portion (the cord 13), with an extending planar portion 12. The cord 13 is a flexible, fibrous cord or rope. A flexible rod of plastic could of course be used in place of the cord. The rod preferably has a uniform cross-section, and is preferably cylindrical, but it may of course have a non-circular cross-sectional shape.

Figure 4:
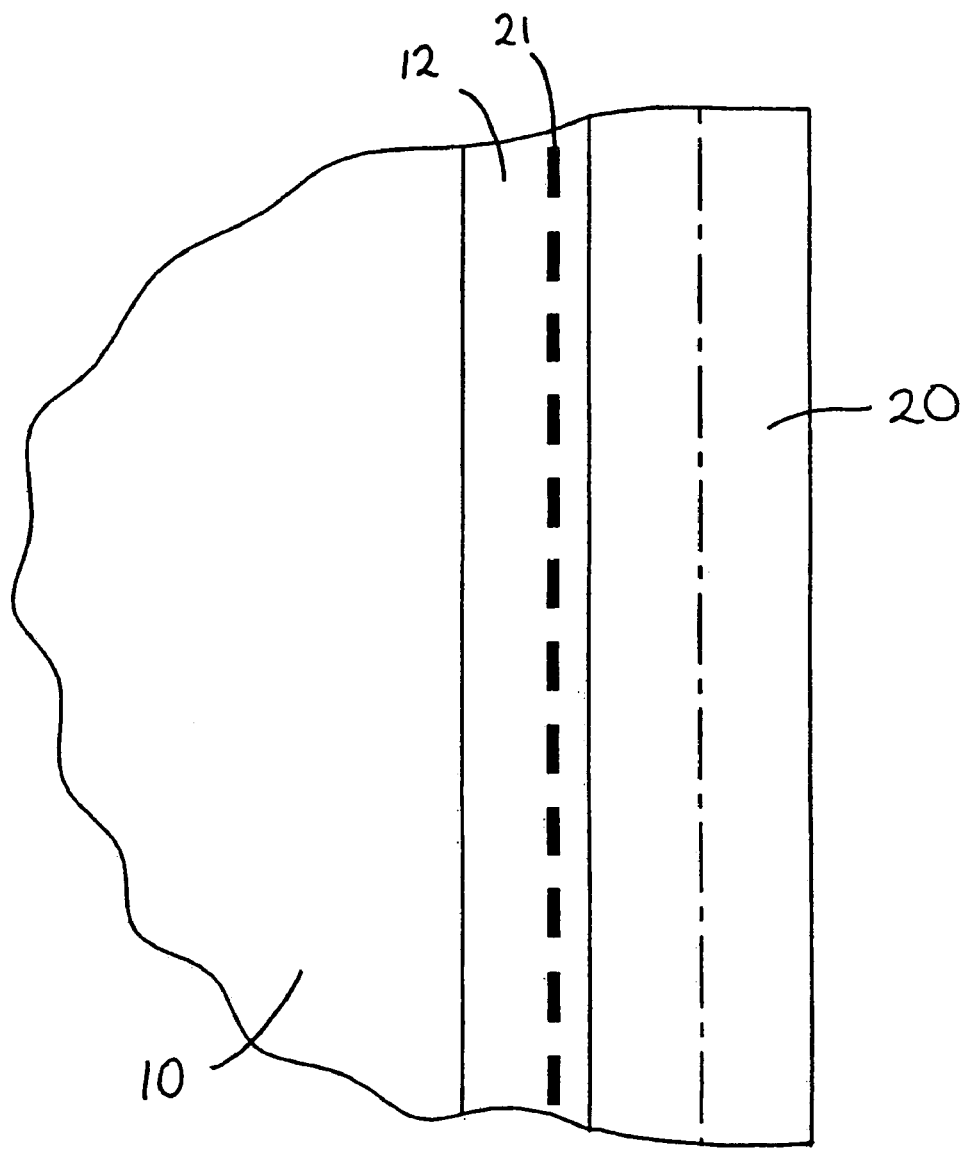
FIG. 4 is a plan view of the seat, frame, and the intermediate connection, perpendicular to the axis of the forward bar.

The planar part of the cover 12 is attached to the fabric of the seat 10 by a seam 21, the seam 21 being parallel with the long axis of the cord 13. The edge of the seat fabric 10 is stitched onto the planar part of the cover 12 such that the edge of the seat and the edge of the cover are overlapping, with the edge of the seat fabric 10 adjacent to the cord part 13 of the connection member 11. FIG. 3 shows the left side of the push chair seat, when viewed from the front. The seat fabric 10, once stitched onto the cover 12, can be folded back on itself. In this way, the seam 21 will not be seen when looking at the seat from the forward view. FIG. 4 shows a plan view of the rear of the seat attached to the forward bar 20.

The forward bar 20 of each side frame of the push chair is an extruded tube. The hollow forward bar is cylindrical, with a groove 23 along one side of the bar, such that the bar 20 has a lune-shaped cross-section. The groove 23 has a circular cross-section. The groove 23 cross-section is just larger than the cross-section of the cord part 13 of the intermediate connection member 11. The width W of the opening of the groove is narrower than the cord's cross-sectional diameter. The cord part 13 of the intermediate connection member 11 can therefore be inserted in the end of the forward bar, and is retained by the opening.

To attach the seat 10 and intermediate connection member 11 to the push chair frame, one end of the cord part 13 of the intermediate connection member 11 can be inserted into the groove 23, at the end of the bar 20. The cord part 13 of the intermediate connection member 11 can then be fed along the groove 23.

Figure 5:
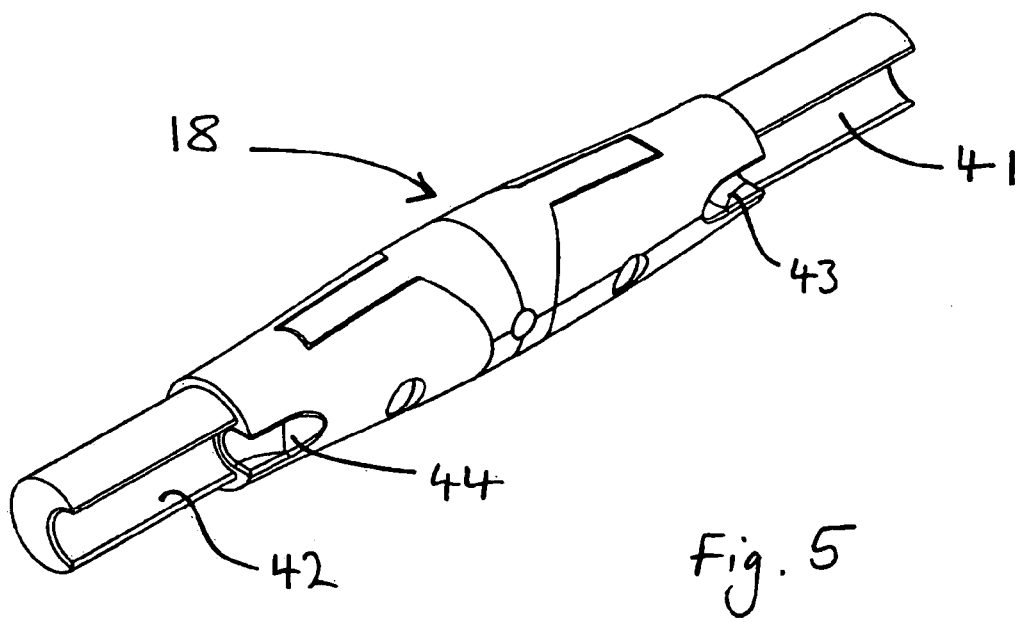
FIG. 5 is a perspective view of the hinge of one of the forward bars of the frame, the hinge being in the unfolded state.

Referring to FIG. 5, the forward bar 20 has an upper groove 41 and a lower groove 42, with the hinge 18 between. There is an upper recess 43 and a lower recess 44 at the upper and lower end of the hinge respectively. The upper recess 43 is adjacent to the upper groove 41 of the forward bar, and the lower recess 44 is adjacent to the lower groove 42.

Figure 6:
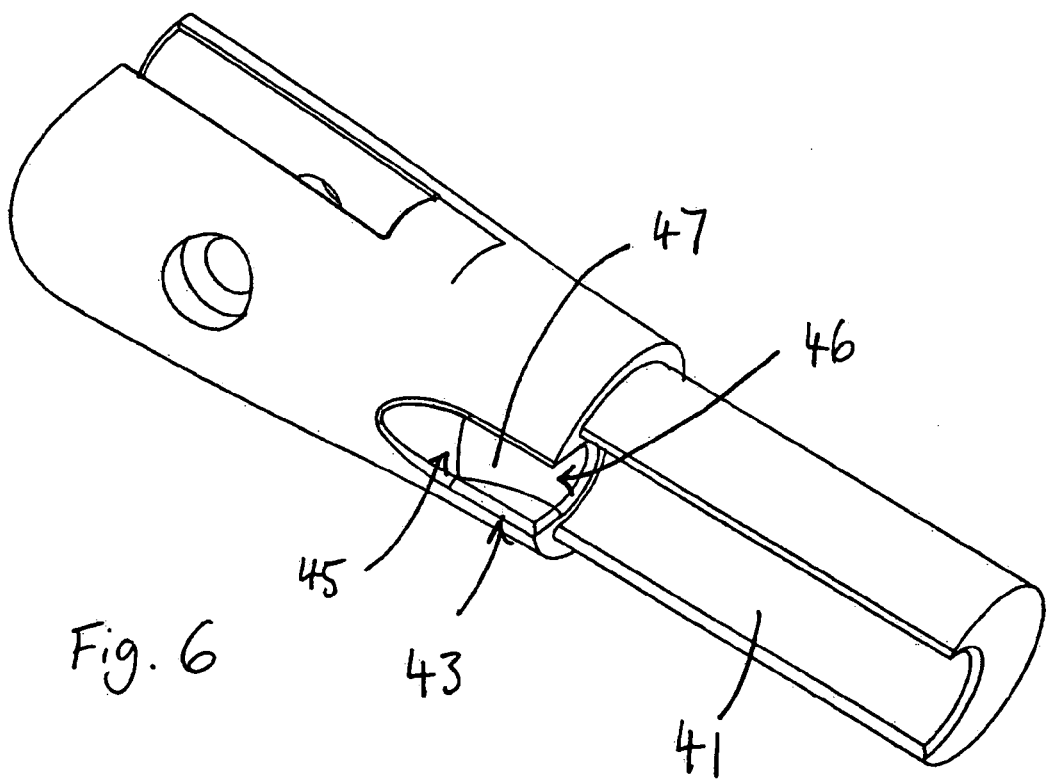
FIG. 6 is a perspective view of part of the hinge.

Referring to FIG. 6, the recess 43 has a top opening 45, a front opening 46, perpendicular to the top opening, and an arcuate base 47. The recess 43 is joined to the groove 41 via the front opening 46. The end of the top opening 45 which is farthest from the front opening is semi-circular or oval shaped. The end of the cord part 13 of the connection member 11 can be inserted into the recess 43, through the semi-circular end-part of the recess 43. The base 47 of the recess 43 is convexly curved, such that once the cord part 13 has been inserted, it is guided through the front opening 46, into the groove 41. The cord part 13 can than be fed along the groove 41 until the whole of the cord 13 is within the groove 41. The recesses therefore act as a lead-in, allowing the cord part 13 of the connection member to be inserted into the groove 41.

Figure 7:
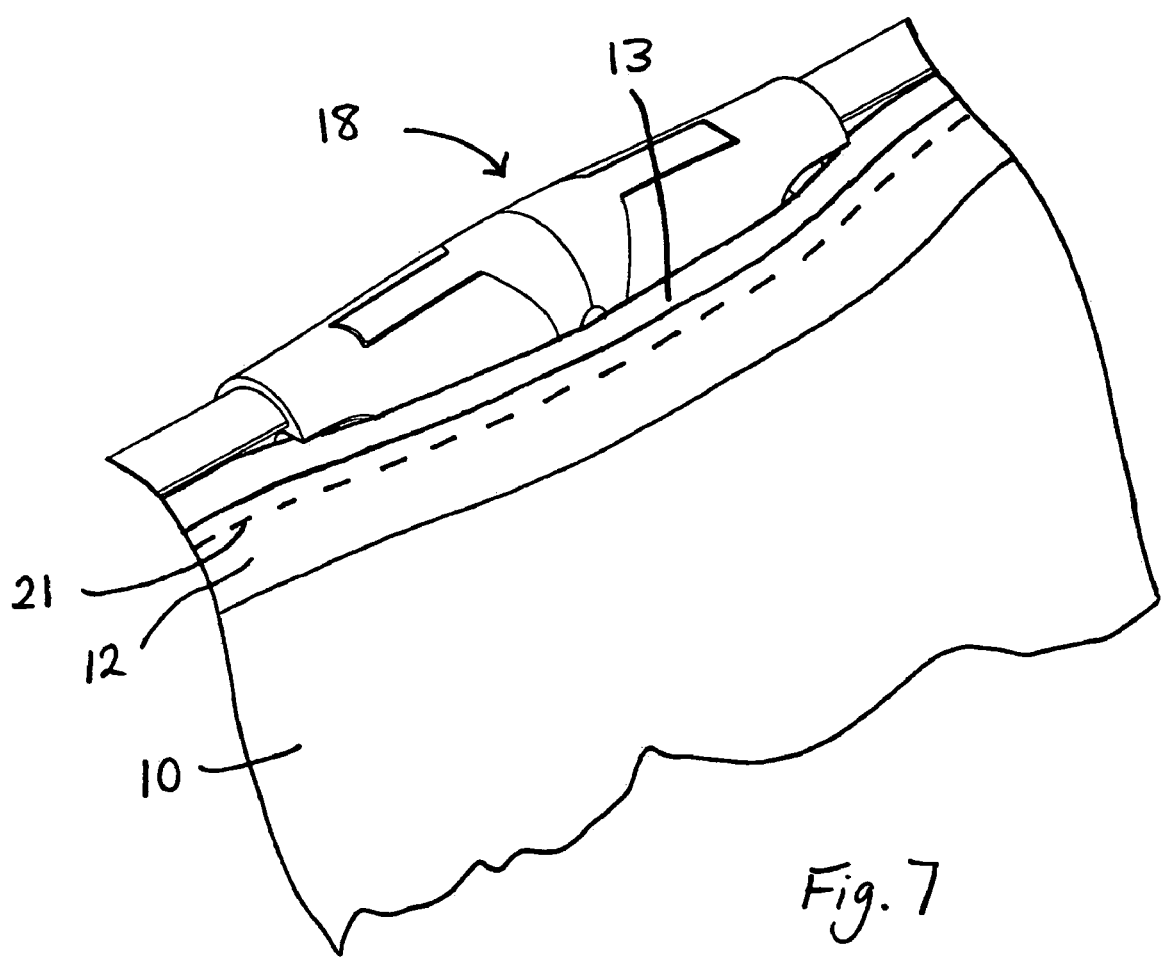
FIG. 7 is a perspective view of the hinge of FIG. 5, with the seat attached to the forward bar.

The intermediate cord part 13 of the connection member of one side of the seat 10 can be inserted in the lower groove 42, via the lower end of the forward bar 20. The end of the cord 13 can be fed along the groove 42, and out of the groove via the recess 44. The end of the cord 13 can then be fed into the groove 41, via the recess 43. Referring to FIG. 7, the lower part of the cord 13 is therefore disposed in groove 42, and the upper part is disposed in groove 41, the middle portion sits adjacent to the hinge. In this way, a single intermediate connection member 11, having a single continuous cord part 13, can be used to attach the side of the push chair to the forward bar 20.

The cord 13 is flexible, therefore it can easily be inserted in the grooves 41, 42 of the forward bar 20. The flexibility of the cord allows for the forward bar to be folded at the hinge 18. The cord 13 has a high tensile strength and therefore the seat can withstand greater loads without risk of becoming detached from the frame. The diameter of the cord part 13 of the intermediate connection member and the corresponding grooves in the forward bars are such that the cord fits firmly in the grooves, and there is friction control during fitting of the connection member in the groove.

The seat connection means described could of course be used to attach a fabric seat to any type of push chair frame, not just an umbrella fold push chair frame. Grooves can be included in the side frames of any type of push chair chassis, for insertion of the intermediate connection means, to attach the seat to the frame.

Alternative embodiments using the principles disclosed will suggest themselves to those skilled in the art upon studying the foregoing description and the drawings. It is intended that such alternatives are included within the scope of the invention, which is limited only by the claims.

We claim:

1. A child's push chair which is foldable side-to-side and top-to-bottom, said push chair comprising:
   a non-rigid seat having
      opposing side edges,
      a back portion, and
      two opposing side portions extending away from the back portion;
   a push-chair frame receiving said seat and comprising first and second opposing side bars each having a hinge joint; and
   seat-attaching means for connecting the side edges of the seat to the side bars, the seat-attaching means including:
      an elongate member secured to at least one of the side edges of the seat, and
   two grooves in at least one of the side bars flanking the repective hinge joint and into which the elongate member is insertable, the grooves each having an opening of a width that is narrower than a cross-sectional diameter of the elongate member such that the elongate member is retained in the grooves.

2. A push chair according to claim 1 wherein the elongate member includes a planar part and an enlarged part, the planar part being secured to one of the side edges of the seat and the enlarged part being insertable in the corresponding groove in the frame.

3. A push chair according to claim 1 wherein the first and second grooves are co-linear in at least one position of said frame.

4. A push chair according to claim 1 wherein the elongate member is rod-shaped.

5. A push chair according to claim 1 wherein the elongate member is a fibrous tension member.

6. A push chair according claim 1 wherein the elongate member is extruded plastic.

* * * * *